US009244728B2

United States Patent
Shao et al.

(10) Patent No.: US 9,244,728 B2
(45) Date of Patent: Jan. 26, 2016

(54) TERMINAL AND SWITCHING METHOD

(75) Inventors: Xiang Shao, Beijing (CN); Fang Xu, Beijing (CN); Ke Shang, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 322 days.

(21) Appl. No.: 13/995,613

(22) PCT Filed: Dec. 20, 2011

(86) PCT No.: PCT/CN2011/084257
§ 371 (c)(1),
(2), (4) Date: Jun. 19, 2013

(87) PCT Pub. No.: WO2012/089042
PCT Pub. Date: Jul. 5, 2012

(65) Prior Publication Data
US 2013/0275742 A1    Oct. 17, 2013

(30) Foreign Application Priority Data

Dec. 27, 2010 (CN) .......................... 2010 1 0606626

(51) Int. Cl.
G06F 15/177 (2006.01)
G06F 9/48 (2006.01)
G06F 1/16 (2006.01)
G06F 1/32 (2006.01)

(52) U.S. Cl.
CPC ............... *G06F 9/48* (2013.01); *G06F 1/1675* (2013.01); *G06F 1/3203* (2013.01)

(58) Field of Classification Search
CPC ...................................................... G06F 9/441
See application file for complete search history.

(56) References Cited

U.S. PATENT DOCUMENTS

| 6,615,303 | B1 * | 9/2003 | Endo et al. | .................... 710/260 |
| 2008/0133829 | A1 * | 6/2008 | Tsuji | .............................. 711/112 |

(Continued)

FOREIGN PATENT DOCUMENTS

| CN | 1384428 A | 12/2002 |
| CN | 1955934 A | 5/2007 |

(Continued)

OTHER PUBLICATIONS

"International Application Serial No. PCT/CN2011/084257, International Search Report mailed Mar. 29, 2012", 2 pgs.

*Primary Examiner* — Kim Huynh
*Assistant Examiner* — Eric Chang
(74) *Attorney, Agent, or Firm* — Schwegman Lundberg & Woessner, P.A.

(57) ABSTRACT

Terminals and switching methods are provided. The terminal includes: a first component (11) connected to a second component (13) via a connection unit (12), the second component (13) being connected to the connection unit (12), and the first (11) and second (13) components being in a first relative position relationship when the connection unit (12) is in the first connection state, or in a second relative position relationship when the connection unit (12) is in the second connection state; a detection unit (14) configured to detect a relative position relationship between the first (11) and second (13) components, and generate a first detection result upon detection of the first relative position relationship, or a second detection result upon detection of the second relative position relationship; and a switching unit (15) connected to the detection unit (14) and configured to switch the terminal to a first operation state based on the first detection result, or to a second operation state based on the second detection result. The terminal includes a first operating system and a second operating system. The first operation state is an operation state in which the first operating system is primarily used, and the second operation state is an operation state in which the second operating system is primarily used.

11 Claims, 2 Drawing Sheets

(56) References Cited

U.S. PATENT DOCUMENTS

2009/0058887 A1 3/2009 Lin
2010/0202105 A1* 8/2010 Chang ..................... 361/679.27

FOREIGN PATENT DOCUMENTS

| CN | 101515226 A | 8/2009 |
|---|---|---|
| JP | 2010-122538 A | 6/2010 |

* cited by examiner

TERMINAL AND SWITCHING METHOD

This application is a U.S. National Stage Application filed under 35 U.S.C §371 of International Application Serial No. PCT/CN2011/084257, filed on Dec. 20, 2011 and published as WO 2012/089042 A1 on Jul. 5, 2012 which application claims priority to Chinese Application No. 201010606626.9, filed on Dec. 27, 2010, both of which applications and publication are incorporated herein by reference in their entireties.

TECHNICAL FIELD

The present invention relates to terminal technology, and more particularly, to terminals and switching methods.

BACKGROUND

Recently, with the rapid development of mobile internet, portable devices such as tablet computers are more suitable for the concept of mobile internet. The market of tablet computers expands explosively. Tablet computers are advantageous in portability and capability of providing better audio-visual experiences. However, conventional operating systems for tablet computers are very limited. The operating systems for traditional computers are typically used, which are designed for mouse and keyboard based operations and cannot take advantages of touch operations and thus cannot meet consumer's requirements.

SUMMARY

Embodiments of the present invention provide a terminal and a switching method that can achieve seamless switching between operation states of the terminal.

According to an embodiment, a terminal is provided. The terminal includes: a first component; a connection unit connected to the first component and having a first connection state or a second connection state; a second component connected to the connection unit, the first component and the second component being in a first relative position relationship when the connection unit is in the first connection state, or in a second relative position relationship when the connection unit is in the second connection state; a detection unit configured to detect a relative position relationship between the first component and the second component and generate a first detection result upon detection of the first relative position relationship, or a second detection result upon detection of the second relative position relationship; and a switching unit connected to the detection unit and configured to switch the terminal to a first operation state based on the first detection result, or to a second operation state based on the second detection result. The terminal includes a first operating system and a second operating system, the first operation state is an operation state in which the first operating system is primarily used and the second operation state is an operation state in which the second operating system is primarily used.

The terminal further includes a memory unit configured to store a program file of the first operating system and a program file of the second operation system.

The first component includes a first display unit and a second display unit provided on opposite sides of the first component. The connection unit includes a first rotation axis, one end of the first component being connected to the first rotation axis and one end of the second component being connected to the second rotation axis such that the first component is rotatable around the second component via the first rotation axis. The first relative position relationship includes a state in which an angle between the first component and the second component is smaller than a predetermined angle, and the second relative position relationship includes a state in which an angle between the first component and the second component is larger than the predetermined angle.

The first display unit is provided on the side of the first component that is away from the second component, and the second display unit is provided on the side of the first component that is close to the second component. The first display unit is configured to display an operation result of the first operating system in the first operation state. The second display unit is configured to display an operation result of the second operating system in the second operation state.

The first component includes a first display unit. The connection unit includes a first rotation axis and a second rotation axis, one end of the first component being connected to the first axis, the first rotation axis being connected to the second rotation axis and one end of the second component being connected to the second rotation axis such that the first component is rotatable around the first rotation axis, and the first component and the first rotation axis are rotatable around the second component via the second rotation axis. The first relative position relationship includes a state in which an angle between the first component and the second component is smaller than a predetermined angle and the first display unit faces outward, and the second relative position relationship includes a state in which an angle between the first component and the second component is larger than the predetermined angle and the first display unit faces inward.

The first display unit is configured to display an operation result of the first operating system in the first operation state, or to display an operation result of the second operating system in the second operation state.

According to another embodiment of the present invention, a switching method for a terminal is provided. The terminal includes a first component and a second component connected via a connection unit and has a first operating system and a second operating system. The method includes: detecting a relative position relationship between the first component and the second component to obtain a first detection result indicative of a first relative position relationship between the first component and the second component, or a second detection result indicative of a second relative position relationship between the first component and the second component; and switching the terminal to a first operation state based on the first detection result, or to a second operation state based on the second detection result. The first operation state is an operation state in which the first operating system is primarily used and the second operation state is an operation state in which the second operating system is primarily used.

The first component includes a first display unit and a second display unit provided on opposite sides of the first component. The connection unit includes a first rotation axis, one end of the first component being connected to the first rotation axis and one end of the second component being connected to the second rotation axis such that the first component is rotatable around the second component via the first rotation axis. The step of detecting the relative position relationship between the first component and the second component to obtain the first detection result includes obtaining the first detection result when detecting that an angle between the first component and the second component is smaller than a predetermined angle, or the step of detecting the relative position relationship between the first component and the second component to obtain the second detection result includes obtaining the second detection result when detecting that an angle between the first component and the second component is larger than the predetermined angle.

The first display unit is provided on the side of the first component that is away from the second component, and the second display unit is provided on the side of the first component that is close to the second component. The step of switching the terminal to the first operation state based on the first detection result or to the second operation state based on the second detection result includes switching the terminal to the first operation state based on the first detection result and displaying on the first display unit an operation result of the first operating system, or switching the terminal to the second operation state based on the second detection result and displaying on the second display unit an operation result of the second operating system.

The terminal includes a first display unit and a second display unit. The step of switching the terminal to the first operation state based on the first detection result or to the second operation state based on the second detection result includes: switching the terminal to the first operation state based on the first detection result and displaying on the first display unit an operation result of the first operating system, or switching the terminal to the second operation state based on the second detection result and displaying on the second display unit an operation result of the second operating system.

The first component includes a first display unit. The connection unit includes a first rotation axis and a second rotation axis, one end of the first component being connected to the first axis, the first rotation axis being connected to the second rotation axis and one end of the second component being connected to the second rotation axis such that the first component is rotatable around the first rotation axis, and the first component and the first rotation axis are rotatable around the second component via the second rotation axis. The step of detecting the relative position relationship between the first component and the second component to obtain the first detection result includes: obtaining the first detection result when detecting that an angle between the first component and the second component is smaller than a predetermined angle and that the first display unit faces outward, or the step of detecting the relative position relationship between the first component and the second component to obtain the second detection result includes: obtaining the second detection result when detecting that an angle between the first component and the second component is larger than the predetermined angle and that the first display unit faces inward.

The step of switching the terminal to the first operation state based on the first detection result or to the second operation state based on the second detection result includes: switching the terminal to the first operation state based on the first detection result and displaying on the first display unit an operation result of the first operating system, or switching the terminal to the second operation state based on the second detection result and displaying on the first display unit an operation result of the second operating system.

The terminal includes a first display unit. The step of switching the terminal to the first operation state based on the first detection result or to the second operation state based on the second detection result includes: switching the terminal to the first operation state based on the first detection result and displaying on the first display unit an operation result of the first operating system, or switching the terminal to the second operation state based on the second detection result and displaying on the first display unit an operation result of the second operating system.

With the embodiments of the present invention, the terminal can determine the relative position relationship between the first component and the second component by using the detection unit. Then the terminal can be switched to the first operation state in which the first operating system is primarily used, or to the second operation state in which the second operating system is primarily used. In this way, it is possible to switch the terminal between different operation states seamlessly, thereby meeting user's requirements in various aspects such as work and entertainment.

DETAILED DESCRIPTION OF THE EMBODIMENTS

The present invention will be further detailed below with reference to the figures and embodiments, such that the solutions of the embodiments can be better understood by those skilled in the art.

First Embodiment

Figure 1:
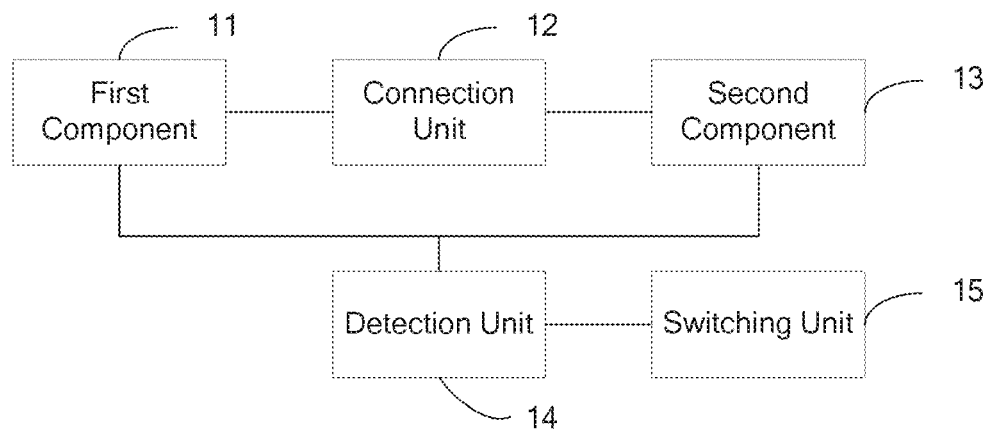
FIG. 1 is a schematic block diagram of a terminal according to an embodiment of the present invention.

Referring to FIG. 1, which is a schematic diagram showing the structure of a terminal according to an embodiment of the present invention, the terminal includes a first component 11, a connection unit 12, a second component 13, a detection unit 14 and a switching unit 15. The connection unit 12 is connected to the first component 11. The second component 13 is connected to the connection unit 12. The first component 11 and the second component 13 are in a first relative position relationship when the connection unit 12 is in a first connection state, or in a second relative position relationship when the connection unit 12 is in a second connection state. The detection unit 14 is configured to detect a relative position relationship between the first component 11 and the second component 13 and generate a first detection result upon detection of the first relative position relationship, or a second detection result upon detection of the second relative position relationship. The switching unit 15 is connected to the detection unit and configured to switch the terminal to a first operation state based on the first detection result, or to a second operation state based on the second detection result. The terminal includes a first operating system and a second operating system. The first operation state is an operation state in which the first operating system is primarily used and the second operation state is an operation state in which the second operating system is primarily used.

The detection unit 14 may detect the relative position relationship between the first component 11 and the second component 13 using various detection schemes including, for example, but not limited to, the following three detection schemes.

In the first detection scheme, the relative position relationship between the first component 11 and the second component 13 is detected by detecting the connection unit 12.

When the connection unit includes a rotation member such as a rotation axis, the determination may be made by detecting a rotation angle using for example a rotation axis detection sensor. In this scheme, a switch circuit may be added for the rotation axis. According to ON and OFF of the rotation axis, the switch circuit may generate a signal for switching between the operation states of the terminal.

When the connection unit includes a sliding member such as a sliding track or a sliding slot, the relative position relationship between the first component 11 and the second component 13 may be determined by detecting the sliding member. Currently, the detection of the sliding member may be carried out by induction of a Hall element. When a magnet on a sliding track is getting close to a Hall element on a sliding slot to create a sliding-to-closure effect, the Hall element generates a level signal to control switching between the operation states of the terminal.

In the second detection scheme, the relative position relationship between the first component 11 and the second component 13 is detected by detecting the first component and the second component instead of the connection unit.

Figure 2:
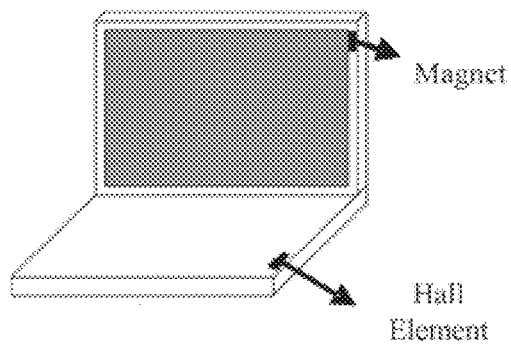
FIG. 2 is a schematic diagram illustrating detection of a non-rotation axis according to an embodiment of the present invention.

When the connection unit includes a rotation member such as a rotation axis, a specific element is provided on a side of the second component which faces the first component. When the first component is rotated via the rotation axis to close up with the second component, the specific element is triggered to switch the operation state of the terminal. Particularly, in the detection process, when the first component is rotated via the rotation axis to close up with the second component, the magnet on the first component comes to contact with the Hall element on the second component. The Hall element then senses that the magnet is getting close and generates a level signal to control the switching of the operation state of the terminal. Reference may be made to FIG. 2, which is a schematic diagram illustrating detection of a non-rotation axis according to an embodiment of the present invention. In an alternative detection process, a trigger switch is provided on the side of the second component of the terminal which faces the first component. When the first component is rotated via the rotation axis to get close to the second component and create a closure effect between the first component and the second component, the first component presses the trigger switch to trigger a circuit to switch the operation state of the terminal. These techniques are well known to those skilled in the art and further details thereof will be omitted here.

When the connection unit includes a sliding member such as a sliding track or a sliding slot, the detection may be carried out by induction of a Hall element. When a magnet on the first component is getting close to a Hall element on the second component to create a sliding-to-closure effect between the first component and the second component, the Hall element generates a level signal to control the switching between the operation states of the terminal.

In the first embodiment, the terminal may further include a memory unit configured to store a program file of the first operating system. The memory unit may also store other files associated with the first operating system and other files associated with the second operation system. The present embodiment is not limited to this.

There may be one memory unit integrated into the first component or the second component.

There may be two memory units integrated into the first operating system and the second operating system, respectively. Both of them may be integrated into either the first component or the second component. The present embodiment is not limited to this.

In the embodiment of the present invention, the terminal can determine the relative position relationship between the first component and the second component by using the detection unit. Then the terminal can be switched to the first operation state in which the first operating system is primarily used, or to the second operation state in which the second operating system is primarily used. In this way, it is possible to switch the terminal between different operation states seamlessly.

Second Embodiment

In addition to the elements described in the first embodiment, the first component may further include a first display unit and a second display unit. The first display unit and the second display unit are provided on opposite sides of the first component. Here, the first display unit may be provided on the side of the first component that is away from the second component and the second display unit may be provided on the side of the first component that is close to the second component.

The connection unit includes a first rotation axis. One end of the first component is connected to the first rotation axis, and one end of the second component is connected to the second rotation axis such that the first component is rotatable around the second component via the first rotation axis.

When the detection unit detects that the relative position relationship between the first component and the second component is a first position relationship in which an angle between the first component and the second component is smaller than a predetermined angle, the switching unit switches the terminal to the first operation state. The detection unit may determine the relative position relationship between the first component and the second component by detecting a horizontal axis. When the detection unit detects that the relative position relationship between the first component and the second component is a second position relationship in which an angle between the first component and the second component is larger than a predetermined angle, the switching unit switches the terminal to the second operation state. The first display unit is configured to display an operation result of the first operating system in the first operation state, and the second display unit is configured to display an operation result of the second operating system in the second operation state.

To facilitate a full understanding of the present invention, the above embodiment will be further explained by taking a notebook computer as an example.

Figure 3:
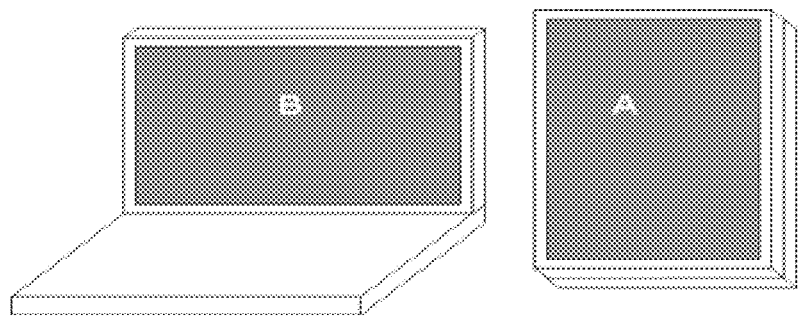
FIG. 3 is a schematic block diagram of a dual-screen notebook computer according to an embodiment of the present invention.

Reference is now made to FIG. 3, which is a schematic block diagram showing a dual-screen notebook computer according to an embodiment of the present invention. In addition to the composition of a conventional notebook computer which includes a display section (the first component), and a host section (the second component) connected to the display section. A rotation axis serves as a connection unit between the display section and the host section. The notebook computer shown in FIG. 3 adds, to the display section, a display screen or a touch screen (the first display unit) provided on side A (opposite to side B of the display section, not shown) of the notebook computer. In this way, the dual-screen notebook computer has a conventional display screen (the second display unit) provided on side B, and an additional display screen or touch screen (the first display unit) provided on side A. The sides A and B are opposite sides of the display section. The display screen or touch screen (the first display unit) on the side A is provided on the side away from the host section (the second component), and the display screen (the second display unit) on the side B is provided on the side close to the host section (the second component).

The display section is controlled to open and close with respect to the host section by rotating the rotation axis serving as the connection unit of the notebook computer, to switch the notebook computer between the first operation state and the second operation state. For example, when the display section of the notebook is closed (i.e., the angle between the display section and the host section is smaller than a predetermined angle, such as an angle corresponding to a detection distance of the detection unit), the notebook is switched to the first operation state, and the operation result of the first operating system is displayed on the display screen or touch screen (the first display unit) on the side A. When the display of the notebook is opened (i.e., the angle between the display and the host is larger than a predetermined angle, such as an angle corresponding to a detection distance of the detection unit), the notebook is switched to the second operation state and the operation result of the second operating system is displayed on the display screen (the second display unit) on the side B. If the first operating system runs on an ARM platform, and the second operating system runs on an X86 platform, according to this embodiment the notebook computer will be switched between the ARM platform and the X86 platform based on the relative position relationship between the first component and the second component as detected by the detection unit, and thus the different operating systems may run on these two platforms.

That is, the notebook computer of this embodiment has two display screens and has a hybrid mode. When the display section of the notebook is opened, the system may run on the X86 platform to use, for example, the Windows operating system and use the display screen on the side B as the display for outputting. As such, the operation mode of the notebook computer is the conventional mode for using the notebook computer. However, in this operation mode, the display screen (the first display unit) on the side A of the notebook computer may further be used as an extended display screen for display and operation for another user. The content displayed on the display screen on the side A may be or may not be the same as that displayed on the display screen on the side B.

When the display section of the notebook computer is closed, the system is automatically switched to the ARM platform to run, for example, an Andriod operating system and use the display screen on the side A as the display for outputting. As such, the notebook computer in this operation mode acts like a Pad/Tablet using an Andriod operating system, and a touch sensitive element on the side A may be further used for operation. Here, when the touch sensitive element is placed overlapping the second display unit, a touch-sensitive display screen may be formed.

Thus, in the embodiment of the present invention, there are generally two operation modes for a dual-screen, dual-system notebook computer.

The first one is a PC mode. In this mode, the display section of the notebook computer is opened and the display screen on the side B of the display of the notebook computer is used for displaying. The notebook computer runs on the X86 platform, and its operating system is a conventional computer operating system, such as Windows. The notebook computer has the same application mode as that of a conventional notebook computer. At this time, the display screen on the side A may display no content.

The second one is a Pad mode. In this mode, the display section of the notebook computer is closed, and the display screen on the side A of the display of the notebook computer is used for displaying. The notebook computer runs on the ARM platform, and its operating system is a mobile internet operating system, such as Andriod. The notebook computer has the same application mode as that of a conventional Pad. At this time, the display screen on the side B may display no content.

A dual-screen, dual-system notebook computer may further include a third operation mode, i.e., a dual-screen display mode. In this mode, the display section of the notebook computer is opened and the display screens on both the side A and the side B of the display of the notebook computer are used for displaying. Different operating systems may be used to display different contents for two users. Both operating systems may accept operations, and information may be shared and exchanged between the two screens. Alternatively, the display section of the notebook computer is opened, and the display screens on both the side A and the side B are used for displaying, while a single operating system may be used, and the same content is displayed on the display screens on the sides A and B.

Of course, in this embodiment, in addition to the arrangement in which the first and second display units are provided on the inner and outer sides of the first component, respectively, the first and the second display units may be provided on the same side of the first component in a tiled arrangement. They may be provided on only the second component, or on the first and the second components, respectively. In addition, the sizes and display schemes of the two display units may be or may not be the same. This embodiment is not limited to this.

Therefore, in the embodiment of the present invention, it is possible to switch the terminal between different operation states seamlessly, thereby meeting user's requirements in various aspects, such as work and entertainment. Also, a dual-screen display can be achieved to display operation results of different operating systems or a single operating system, thereby improving display effects. Meanwhile, a dual-screen, dual-platform terminal may share components, such as hard disk and network adapter. This will effectively reduce cost.

Third Embodiment

In addition to the elements described in the first embodiment, the first component may include a first display unit.

The connection unit includes a first rotation axis and a second rotation axis. One end of the first component is connected to the first axis, the first rotation axis is connected to the second rotation axis, and one end of the second component is connected to the second rotation axis, such that the first component is rotatable around the first rotation axis, and the first component and the first rotation axis are rotatable around the second component via the second rotation axis.

The first relative position relationship includes a state in which an angle between the first component and the second component is smaller than a predetermined angle and the first display unit faces outward. The second relative position relationship includes a state in which an angle between the first component and the second component is larger than the predetermined angle and the first display unit faces inward.

The detection unit generates a first detection result when detecting that the relative position relationship between the first component and the second component is the first relative position relationship, or generates a second detection result when detecting that the relative position relationship between the first component and the second component is the second relative position relationship. Here, the detection unit detects switching of rotation axis in a vertical range (and in a horizontal range), and determines the relative position relationship between the first component and the second component as the first relative position relationship.

The switching unit switches the terminal to the first operation state based on the first detection result, and the operation result of the first operating system is displayed on the first display unit. Alternatively, the switching unit switches the terminal to the second operation state based on the second detection result, and the operation result of the second operating system is displayed on the first display unit.

To facilitate a full understanding of the present invention, the above embodiment will be further explained by taking a notebook computer as an example.

Figure 4:
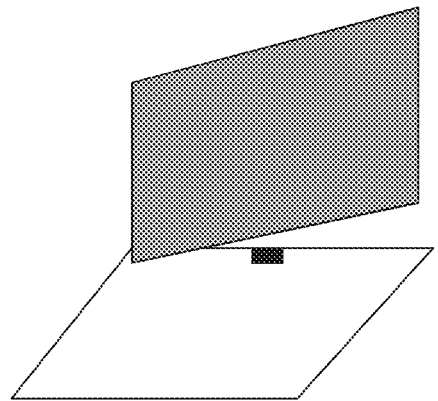
FIG. 4 is a schematic diagram showing longitudinal rotation of a single-screen notebook computer according to an embodiment of the present invention.

Reference is now made to FIG. 4, which is a schematic diagram showing longitudinal rotation of a single-screen notebook computer according to an embodiment of the present invention. The notebook computer in this embodiment is a conventional notebook computer including a display section (the first component) and a host section (the second component) connected to the display. The display section includes a display screen (the second display unit) on its inner side opposite to the host section. There are two rotation axes serving as a connection unit between the display and host sections. The display section of the notebook computer can not only be opened and closed with respect to the host section via a lateral axis, but also be longitudinally rotated via a longitudinal axis. In the longitudinal rotation, the display screen of the display section can be rotated to the outer side of the display section (i.e., changing from being close to the host to being away from the host). Then, the display screen can be rotated via the lateral axis to close up with the host section, so as to form a different physical posture of the notebook computer.

As shown in FIG. 4, the display screen of the display section of the notebook computer has a hybrid mode. When the display section of the notebook computer is separated from the host (i.e., when the display is opened with the angle between the display and host sections being larger than a predetermined angle), and the display screen of the display section is on the side close to the host section (facing inward), the system runs on the X86 platform. In this case, the Windows operating system may be used, for example, and the display screen is used as the display section for outputting. This operation mode of the notebook computer is now a conventional operation mode of the notebook computer.

When the display section of the notebook is longitudinally rotated so that the display screen of the display section is on the side away from the host section (facing outward), and the display section is closed up with the host section (i.e., the angle between the display and host sections is smaller than a predetermined angle), the system is automatically switched to the ARM platform. In this case, the Andriod operating system is used, and the display screen is still used as the display. The notebook computer in this operation mode acts like a Pad.

Fourth Embodiment

In this embodiment, the notebook computer includes a display section and a host section. The display section is connected to the host section via a connection unit. The display section has a first display screen on its side A and a second display screen on its side B. The first and second display screens are provided on the inner and outer sides of the display section, respectively. The display screen on the side close to the host section (side B) is the second display screen, while the display screen on the side away from the host section (side A) is the first display screen. If the connection unit includes a rotation axis, a sensor may be provided on the rotation axis, and control circuit may be connected to the sensor. When the control circuit detects that the display section of the notebook computer is opened with respect to the host section, it controls to power on the second display screen on the inner side of the display section of the notebook computer, and controls the system to switch to the X86 platform using, for example, the Windows operating system.

There are two modes when the control circuit detects that the display and host sections of the notebook computer are closed together.

One mode is notebook computer ON mode. When the notebook computer is closed up, the control circuit controls to power off the second display screen on the side B and power on the first display screen on the side A. Also, the control circuit controls to switch the system to the ARM platform using a mobile internet operating system. Further, a control switch may be provided on the side A or a lateral side of the notebook computer for turning off the first display screen on the side A or the system when they are not used.

The other mode is notebook computer OFF mode. When the notebook computer is closed up, both the first and second display screens are powered off. Further, the system may be turned on using a switch provided on a lateral side of the notebook computer to power on the first display screen on the side A. In this case, the system runs on the ARM platform. At this time, if the display section of the notebook computer is opened, the mode will be automatically switched.

Fifth Embodiment

In this embodiment, the notebook computer includes a display section and a host section. The display section is connected to the host section via a connection unit including a horizontal rotation axis and a vertical rotation axis. The display section has a display screen on a side (inner side) facing the host section, i.e., side B of the display section. When the display section of the notebook computer is opened with respect to the host, a display is presented on the side B, the system runs on the X86 platform, and the operation result of the X86 platform is displayed on the display. When the display section of the notebook computer is rotated around the vertical axis to close up with the host section, although the display screen is not separated from the display section, the spatial position of the display screen is now on the side opposite to the side B of the notebook computer prior to the rotation, and the control circuit controls to switch the system to the ARM platform.

Throughout the above embodiments, the terminal may further includes a first processing unit for executing the first operating system, and a second processing unit for executing the second operating system. When the first operating system is being executed, the first processing unit receives the detection result sent from the detection unit, and wakes up the second processing unit based on the detection result such that the second processing unit executes the second operating system, and the first processing unit and the first operating system enter a sleep/off state. Alternatively, when the second operating system is being executed, the second processing unit receives the detection result sent from the detection unit, and wakes up the first processing unit based on the detection result such that the first processing unit executes the first operating system, and the second processing unit and the second operating system enter a sleep/off state.

The terminal may include only a first processor that executes both the operating systems. The terminal may be switched between the different operating systems based on the detection result. When the first operating system is being executed, the first processing unit receives the detection result sent from the detection unit, wakes up the second operating system based on the detection result, and allows the first operating system to enter a sleep/off state. Alternatively, when the second operating system is being executed, the first processing unit receives the detection result sent from the detection unit, wakes up the first operating system based on the detection result, and allows the second operating system to enter a sleep/off state.

Here, in the above embodiments, the first processing unit may be less powerful or consume less power than the second processing unit. For example, the first processing unit may be a processor based on ARM architecture, and the second processing unit may be a processor based on X86 architecture. However, their performances/power consumptions are not necessarily different from each other, i.e., they may be processors with the same performance/power consumption.

In the above embodiments, the first operating system may be an operating system for a mobile internet device, such as Andriod, WinCE, iOS, Symbian, Megoo and Blackberry OS. The second operating system may be an operating system for a conventional computer, such as Windows, Linux, Mac OS and Chorme OS.

In the above embodiment, the first operating system being primarily used means that the terminal may execute only the first operating system while the second operating system may be in a sleep state, or that the terminal may execute the two operating systems, but display only the operation result of the first operating system.

Similarly, the second operating system being primarily used means that the terminal may execute only the second operating system while the first operating system may be in a sleep state, or that the terminal may execute the two operating systems, but display only the operation result of the second operating system.

In the above embodiments, the connection unit is not limited to the form of rotation axis (i.e., the terminal is not limited to the form of notebook computer). The connection unit may have a form of sliding mechanism (i.e., the terminal may be a device like a sliding handset).

That is, the connection unit may include a first sliding element and a second sliding element. The first sliding element is connected to the first component, and the second sliding element is connected to the second component. The first component and the second component are slidable relative to each other via the first sliding element and the second sliding element.

A first connection state includes a state in which the relative sliding distance between the first sliding element and the second sliding element is smaller than a predetermined distance. A second connection state includes a state in which the relative sliding distance between the first sliding element and the second sliding element is larger than a predetermined distance.

Alternatively, the first connection state includes a state in which the area by which the first component and the second component overlap with each other is smaller than a predetermined area. The second connection state includes a state in which the area by which the first component and the second component overlap with each other is larger than a predetermined area.

Currently, a sliding device also utilizes induction of a Hall element. When a magnet is getting close to the Hall element, the Hall element generates a level signal to control the switching of the operation state of the terminal.

It is to be noted that the hybrid mode in the embodiments of the present invention is a hybrid mode of an X86 architecture and an ARM architecture.

Here, the X86 architecture is an architecture for conventional computers including notebook computers and desktop computers. It mainly executes the Windows operating system from Microsoft and also other operating systems such as Linux and Mac OS.

The ARM architecture is mainly used in embedded systems, mostly applied in portable devices such as Tablet computers and smart phones. It mainly executes mobile internet operating systems such as Andriod and iOS.

Alternatively, the same architecture may be used, with different configuration files for implementing different interfaces or operation modes. For example, one mode may be a mode which facilitates operations using mouse (or touch pad and/or pointer) and keyboard, and the other mode is a mode which facilitates operations using a touch screen.

Figure 5:
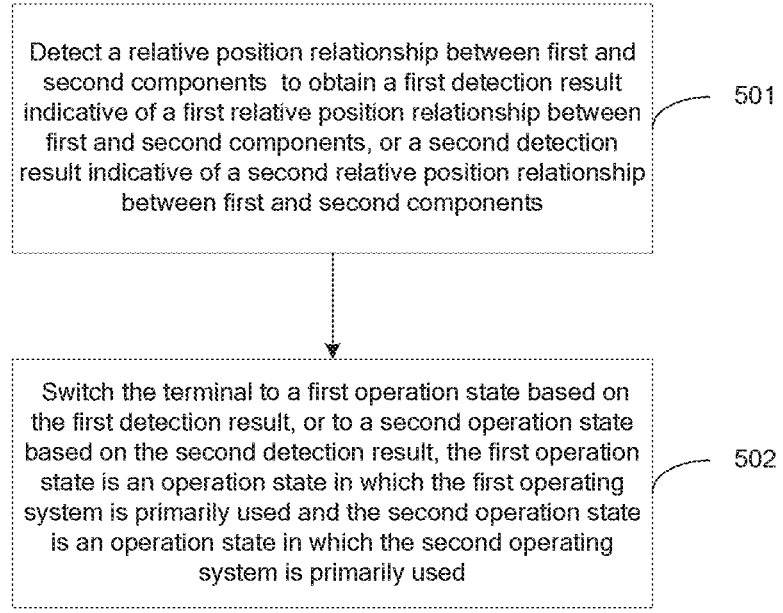
FIG. 5 is a flowchart of a switching method according to an embodiment of the present invention.

In addition to the above described embodiments of the terminals, a switching method is provided according to an embodiment of the present invention. The flowchart of the method is shown in FIG. 5. The method may be applied in a terminal including a first component and a second component connected via a connection unit and having a first operating system and a second operating system. The method includes the following steps.

At step 501, a relative position relationship between the first and second components is detected to obtain a first detection result indicative of a first relative position relationship between the first and second components, or a second detection result indicative of a second relative position relationship between the first and second components.

At step 502, the terminal is switched to a first operation state based on the first detection result, or to a second operation state based on the second detection result. The first operation state is an operation state in which the first operating system is primarily used, and the second operation state is an operation state in which the second operating system is primarily used.

In an embodiment, the first component includes first and second display units provided on opposite sides of the first component. The connection unit includes a first rotation axis. One end of the first component is connected to the first rotation axis, and one end of the second component is connected to the second rotation axis such that the first component is rotatable around the second component via the first rotation axis.

In the step 501, detecting the relative position relationship between the first component and the second component to obtain the first detection result includes obtaining the first detection result when detecting that an angle between the first component and the second component is smaller than a predetermined angle.

In the step 501, detecting the relative position relationship between the first component and the second component to obtain the second detection result includes obtaining the second detection result when detecting that an angle between the first component and the second component is larger than the predetermined angle.

When the first display unit is provided on the side of the first component that is away from the second component, and the second display unit is provided on the side of the first component that is close to the second component, in the step

502, switching the terminal to the first operation state based on the first detection result or to the second operation state based on the second detection result includes switching the terminal to the first operation state based on the first detection result and displaying on the first display unit an operation result of the first operating system, or switching the terminal to the second operation state based on the second detection result and displaying on the second display unit an operation result of the second operating system.

In another embodiment, the terminal includes first and second display units. In addition to the arrangement in which the first and second display units are provided on opposite sides of the first component, respectively, the first and the second display units may be provided on the second component, or on the first and second components, respectively. The embodiments are not limited to this.

The step of switching the terminal to the first operation state based on the first detection result or to the second operation state based on the second detection result includes: switching the terminal to the first operation state based on the first detection result and displaying on the first display unit an operation result of the first operating system, or switching the terminal to the second operation state based on the second detection result and displaying on the second display unit an operation result of the second operating system.

In another embodiment, the first component includes a first display unit. The connection unit includes a first rotation axis and a second rotation axis, one end of the first component being connected to the first axis, the first rotation axis being connected to the second rotation axis and one end of the second component being connected to the second rotation axis such that the first component is rotatable around the first rotation axis, and the first component and the first rotation axis are rotatable around the second component via the second rotation axis.

The step of detecting the relative position relationship between the first component and the second component to obtain the first detection result includes: obtaining the first detection result when detecting that an angle between the first component and the second component is smaller than a predetermined angle and that the first display unit faces outward.

Alternatively, the step of detecting the relative position relationship between the first component and the second component to obtain the second detection result includes: obtaining the second detection result when detecting that an angle between the first component and the second component is larger than the predetermined angle and that the first display unit faces inward.

The step of switching the terminal to the first operation state based on the first detection result or to the second operation state based on the second detection result includes: switching the terminal to the first operation state based on the first detection result and displaying on the first display unit an operation result of the first operating system, or switching the terminal to the second operation state based on the second detection result and displaying on the first display unit an operation result of the second operating system.

The terminal includes a first display unit. The step of switching the terminal to the first operation state based on the first detection result or to the second operation state based on the second detection result includes: switching the terminal to the first operation state based on the first detection result and displaying on the first display unit an operation result of the first operating system, or switching the terminal to the second operation state based on the second detection result and displaying on the first display unit an operation result of the second operating system.

In the embodiments, in addition to the arrangement in which the first display unit is provided on the inner side of the first component, the first display unit may be provided on the outer side of the first component or provided on the second component. The embodiments are not limited to this.

In the embodiments of the present invention, the terminal can determine the relative position relationship between the first and second components by using the detection unit. Then the terminal can be switched to the first operation state in which the first operating system is primarily used, or to the second operation state in which the second operating system is primarily used. In this way, it is possible to switch the terminal between different operation states seamlessly.

Further, the terminal according to the present invention can have three operation modes: a conventional mode, a Pad mode and a dual-screen mode. It is possible to switch the terminal between these modes seamlessly, thereby meeting user's requirements in various aspects such as work and entertainment. Also, a dual-screen display can be achieved to improve display effects. Meanwhile, such dual-screen, dual-platform terminal can share components such as hard disk and network adapter, thereby effectively reducing cost.

It is also to be noted that the terms such as "first" and "second" as used herein are only intended for distinguishing one entity or operation from another. It does not necessarily require or imply any actual relation or sequence between these entities or operations. Further, the terms "comprise" or "include" or any variants thereof are non-exclusive such that a process, method, article or apparatus comprising a number of elements comprise not only the listed elements, but also other elements that are not explicitly listed or elements that are inherently included in the process, method, article or apparatus. Unless stated otherwise, a process, method, article or apparatus defined as comprising an element does not exclude the presence of one or more identical elements in the process, method, article or apparatus.

From the above description of the embodiments, it can be appreciated by those skilled in the art that the present invention can be implemented in software in combination with appropriate hardware or in hardware only, with the former being preferred in most cases. That is, the solution of the present invention, essentially, or a part thereof which makes a contribution over the prior art, can be embodied in a form of software product. This computer software product can be stored on a readable storage medium, such as ROM/RAM, a magnetic disk or a optical disc and include instructions enabling a computer (such as a personal computer, a server or a network element) to perform the methods according to the various embodiments of the present invention.

The present invention has been described with reference to the above embodiments. However, the scope of the present invention is not limited to the above embodiments. Modifications and alternatives can be made by those skilled in the art without departing from the scope of the present invention. These modifications and alternatives are to be encompassed by the scope of the present invention.

What is claimed is:

1. A terminal, comprising:
   a first component;
   a connection unit connected to the first component and having a first connection state or a second connection state;
   a second component connected to the connection unit, the first component and the second component being in a first relative position relationship when the connection unit is in the first connection state, or in a second relative position relationship when the connection unit is in the second connection state;
a detection unit configured to detect a relative position relationship between the first component and the second component and generate a first detection result upon detection of the first relative position relationship, or a second detection result upon detection of the second relative position relationship; and
a switching unit connected to the detection unit and configured to switch the terminal to a first operation state based on the first detection result, or to a second operation state based on the second detection result,
wherein the terminal comprises a first operating system and a second operating system, the first operation state is an operation state in which the first operating system is primarily used and the second operation state is an operation state in which the second operating system is primarily used,
wherein, the first component comprises a first display unit; the connection unit comprises a first rotation axis and a second rotation axis, wherein the first rotation axis is a lateral axis and the second rotation axis is a longitudinal axis, one end of the first component is connected to the first axis, the first rotation axis is connected to the second rotation axis, and one end of the second component is connected to the second rotation axis such that the first component is rotatable around the first rotation axis, and the first component and the first rotation axis are rotatable around the second component via the second rotation axis, and
wherein the first relative position relationship comprises a state in which an angle between the first component and the second component is smaller than a predetermined angle and the first display unit faces outward, and the second relative position relationship comprises a state in which an angle between the first component and the second component is larger than the predetermined angle and the first display unit faces inward.

2. The terminal of claim 1, further comprising:
a memory unit configured to store a program file of the first operating system and a program file of the second operation system.

3. The terminal of claim 1, wherein
the first component comprises a first display unit and a second display unit, the first display unit and the second display unit being provided on opposite sides of the first component,
the connection unit comprises a first rotation axis, wherein one end of the first component is connected to the first rotation axis, and one end of the second component is connected to the second rotation axis such that the first component is rotatable around the second component via the first rotation axis, and
the first relative position relationship comprises a state in which an angle between the first component and the second component is smaller than a predetermined angle, and the second relative position relationship comprises a state in which an angle between the first component and the second component is larger than the predetermined angle.

4. The terminal of claim 3, wherein
the first display unit is provided on the side of the first component that is away from the second component, and the second display unit is provided on the side of the first component that is close to the second component,
the first display unit is configured to display an operation result of the first operating system in the first operation state, and
the second display unit is configured to display an operation result of the second operating system in the second operation state.

5. The terminal of claim 1, wherein the first display unit is configured to display an operation result of the first operating system in the first operation state, or to display an operation result of the second operating system in the second operation state.

6. A switching method for a terminal comprising a first component and a second component connected via a connection unit and having a first operating system and a second operating system, the method comprising:
detecting a relative position relationship between the first component and the second component to obtain a first detection result indicative of a first relative position relationship between the first component and the second component, or a second detection result indicative of a second relative position relationship between the first component and the second component; and
switching the terminal to a first operation state based on the first detection result, or to a second operation state based on the second detection result,
wherein the first operation state is an operation state in which the first operating system is primarily used and the second operation state is an operation state in which the second operating system is primarily used,
wherein, the first component comprises a first display unit;
wherein the connection unit comprises a first rotation axis and a second rotation axis, wherein the first rotation axis is a lateral axis and the second rotation axis is a longitudinal axis, one end of the first component is connected to the first axis, the first rotation axis is connected to the second rotation axis, and one end of the second component is connected to the second rotation axis such that the first component is rotatable around the first rotation axis, and the first component and the first rotation axis are rotatable around the second component via the second rotation axis, and
detecting the relative position relationship between the first component and the second component to obtain the first detection result comprises:
obtaining the first detection result when detecting that an angle between the first component and the second component is smaller than a predetermined angle and that the first display unit faces outward, or
detecting the relative position relationship between the first component and the second component to obtain the second detection result comprises:
obtaining the second detection result when detecting that an angle between the first component and the second component is larger than the predetermined angle and that the first display unit faces inward.

7. The method of claim 6, wherein
the first component comprises a first display unit and a second display unit, the first display unit and the second display unit being provided on opposite sides of the first component,
the connection unit comprises a first rotation axis, wherein one end of the first component is connected to the first rotation axis, and one end of the second component is connected to the second rotation axis such that the first component is rotatable around the second component via the first rotation axis, and detecting the relative position relationship between the first component and the second component to obtain the first detection result comprises:

obtaining the first detection result when detecting that an angle between the first component and the second component is smaller than a predetermined angle, or detecting the relative position relationship between the first component and the second component to obtain the second detection result comprises:

obtaining the second detection result when detecting that an angle between the first component and the second component is larger than the predetermined angle.

8. The method of claim 7, wherein the first display unit is provided on the side of the first component that is away from the second component and the second display unit is provided on the side of the first component that is close to the second component, and switching the terminal to the first operation state based on the first detection result or to the second operation state based on the second detection result comprises:

switching the terminal to the first operation state and displaying on the first display unit an operation result of the first operating system based on the first detection result, or switching the terminal to the second operation state and displaying on the second display unit an operation result of the second operating system based on the second detection result.

9. The method of claim 6, wherein the terminal comprises a first display unit and a second display unit, and switching the terminal to the first operation state based on the first detection result or to the second operation state based on the second detection result comprises:

switching the terminal to the first operation state based on the first detection result, and displaying on the first display unit an operation result of the first operating system, or switching the terminal to the second operation state based on the second detection result, and displaying on the second display unit an operation result of the second operating system.

10. The method of claim 6, wherein switching the terminal to the first operation state based on the first detection result or to the second operation state based on the second detection result comprises:

switching the terminal to the first operation state based on the first detection result, and displaying on the first display unit an operation result of the first operating system, or switching the terminal to the second operation state based on the second detection result, and displaying on the first display unit an operation result of the second operating system.

11. The method of claim 6, wherein the terminal comprises a first display unit, and switching the terminal to the first operation state based on the first detection result or to the second operation state based on the second detection result comprises:

switching the terminal to the first operation state based on the first detection result, and displaying on the first display unit an operation result of the first operating system, or switching the terminal to the second operation state based on the second detection result, and displaying on the first display unit an operation result of the second operating system.

* * * * *